United States Patent
Schmidt et al.

(10) Patent No.: US 7,877,598 B2
(45) Date of Patent: Jan. 25, 2011

(54) METHOD FOR TRANSMITTING ENCRYPTED USER DATA OBJECTS

(75) Inventors: Andreas Schmidt, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 460 days.

(21) Appl. No.: 10/577,589

(22) PCT Filed: Sep. 2, 2004

(86) PCT No.: PCT/EP2004/052002

§ 371 (c)(1),
(2), (4) Date: Apr. 27, 2006

(87) PCT Pub. No.: WO2005/043942

PCT Pub. Date: May 12, 2005

(65) Prior Publication Data

US 2007/0074017 A1 Mar. 29, 2007

(30) Foreign Application Priority Data

Oct. 27, 2003 (DE) ................. 103 50 083

(51) Int. Cl.
*H04L 29/12* (2006.01)
(52) U.S. Cl. ....................... 713/154; 709/232
(58) Field of Classification Search ............ None
See application file for complete search history.

(56) References Cited

U.S. PATENT DOCUMENTS 5,918,013 A * 6/1999 Mighdoll et al. ............. 709/217

(Continued)

FOREIGN PATENT DOCUMENTS

DE 197 17 149 C2 10/1998

(Continued)

OTHER PUBLICATIONS

Smith, Jr et al. "Transcoding Internet Content for Heterogeneous Client Devices" May 1998, Proc. IEEE Int. Conf. on Circuits and Systems, ISCAS, 4 pages.*

(Continued)

*Primary Examiner*—William R Korzuch
*Assistant Examiner*—Michael R Vaughan
(74) *Attorney, Agent, or Firm*—Laurence A. Greenberg; Werner H. Stemer; Ralph E. Locher (57) ABSTRACT

A method for transmitting encrypted user data objects to a first telecommunications terminal includes the following steps: first, in a switching component of a telecommunications network, an encrypted user data object that is to be transmitted to the first telecommunications terminal is provided with a reference for acquiring the description of characteristics of the encrypted user data object; the switching component then determines a profile relating to the capacity of the first telecommunications terminal for processing a user data object; in addition, the switching component transmits a request, together with the profile that has been determined for the first telecommunications terminal, to a data provision component (in particular of the provider of the user data objects), in accordance with an address that is contained in the reference, in order to verify whether the user data object that is to be transmitted can be processed by the first telecommunications terminal; the data provision component then communicates information relating to the verification by the switching component and optionally the latter provides an encrypted user data object according to the information relating to the verification and informs the first telecommunications terminal of said provision.

25 Claims, 2 Drawing Sheets

U.S. PATENT DOCUMENTS

| | | | |
|---|---|---|---|
| 6,421,733 B1 * | 7/2002 | Tso et al. | 709/246 |
| 6,615,212 B1 * | 9/2003 | Dutta et al. | 707/10 |
| 6,763,460 B1 * | 7/2004 | Hild et al. | 713/161 |
| 6,963,972 B1 * | 11/2005 | Chang et al. | 713/153 |
| 6,978,316 B2 * | 12/2005 | Ghaffar et al. | 709/246 |
| 7,170,999 B1 * | 1/2007 | Kessler et al. | 380/277 |
| 7,296,295 B2 * | 11/2007 | Kellerman et al. | 726/26 |
| 7,711,959 B2 * | 5/2010 | Schmidt et al. | 713/181 |
| 2001/0039615 A1 * | 11/2001 | Bowker et al. | 713/162 |
| 2001/0047422 A1 | 11/2001 | McTernan et al. | |
| 2002/0077986 A1 * | 6/2002 | Kobata et al. | 705/52 |
| 2002/0087549 A1 | 7/2002 | Mostafa | |
| 2002/0143975 A1 * | 10/2002 | Kimura et al. | 709/231 |
| 2002/0152175 A1 | 10/2002 | Armstrong et al. | |
| 2003/0050973 A1 | 3/2003 | Tracton et al. | |
| 2003/0159067 A1 | 8/2003 | Stirbu | |
| 2003/0182567 A1 | 9/2003 | Barton et al. | |
| 2004/0185883 A1 * | 9/2004 | Rukman | 455/466 |
| 2005/0060411 A1 * | 3/2005 | Coulombe et al. | 709/227 |
| 2008/0059647 A1 * | 3/2008 | Jabri et al. | 709/231 |
| 2009/0013414 A1 * | 1/2009 | Washington et al. | 726/32 |
| 2009/0199287 A1 * | 8/2009 | Vantalon et al. | 726/9 |
| 2009/0210936 A1 * | 8/2009 | Omar et al. | 726/14 |

FOREIGN PATENT DOCUMENTS

| | | |
|---|---|---|
| WO | 01/43008 A1 | 6/2001 |
| WO | WO 02/43414 A2 | 5/2002 |
| WO | WO 03/040898 A1 | 5/2003 |

OTHER PUBLICATIONS

SONERA/MEDIALAB: Mobile Digital Rights Management White Paper, dated Aug. 6, 2003; pp. 1-11, XP -002314270.

Carvalho, et al.: Pamm Platform: A DRM Solution for MMS Content, Jun. 24, 2003, pp. 1-14, XP 002314271.

\* cited by examiner

METHOD FOR TRANSMITTING ENCRYPTED USER DATA OBJECTS

BACKGROUND OF THE INVENTION

Field of the Invention

The present invention relates to a method for transmitting encrypted user data objects (NDO) to a telecommunications terminal, such as a mobile telephone for example. The present invention relates more particularly to a method by means of which encrypted user data objects can be transmitted to the telecommunications terminal in an efficient manner without the user of the telecommunications terminal incurring excessive or, as the case may be, excessively high charges.

A method or service for the reliable and accountable transmission of user data objects to a telecommunications terminal, in particular a terminal implemented as a mobile radio device or mobile telephone, in a telecommunication network is under discussion at the present time. In this arrangement the transmission or even downloading of the user data objects to the mobile radio device is to be performed using a protocol specified by the Open Mobile Alliance (OMA) or an internet protocol (e.g. Hypertext Transfer Protocol: http). A service for transmitting can in this case be specified such that it is to be made possible for a user with an application program which is available on the mobile radio device and which can be designated as a transmission client or, in the case of a pure downloading of data, as a download client, to transmit arbitrary user data objects which are offered by one or more data provisioning components, in particular servers of service providers or content providers, in the data communications network.

In this case the WAP forum or its successor organization Open Mobile Alliance (OMA) has defined various methods for managing explicit usage rights for digital content of any type, including for example multimedia data. It is provided here to apply restrictions to a user data object that is to be transmitted with regard to its use by the recipient or user of the mobile radio device. This can be used, for example, to limit the number of uses of the user data object or also to limit the period of use. The practical implementation is accomplished through the description of the restrictions by means of a corresponding language, such as, for example, ODRL (Open Digital Rights Language) or OMA DRM specified by the OMA, whereby the transmission client or another special application, a so-called DRM agent, receives the rights description for the purpose of managing the rights (DRM: Digital Rights Management) linked to a (digital) user data object, evaluates same, stores it on the mobile radio device in a protected memory area that is not accessible to the user and, in the case of a request from the user to use the object, grants or does not grant rights in accordance with the rights description. The user data object itself can be protected against unauthorized access either by being stored in encrypted form in a freely accessible memory area on the mobile radio device or by being managed by a special application, for example the DRM agent, which allows no unauthorized access to the object by the user.

According to a variant specified by the Open Mobile Alliance, referred to as "separate delivery", for the management of DRM-protected contents, a user data object provided by a data provisioning component is packed in encrypted form and for the purpose of transport and for storage onto a telecommunications terminal, such as a mobile radio device, in a so-called container file or a so-called container object (which has been assigned for example the data type or content type "Application/VND.OMA.DRM.Content"). With a service for the reliable transmission of content from a data provisioning component (content download), the encrypted user data object, packed in the container object using WAP protocols (such as for example the WSP: Wireless Session Protocol) or internet protocols (such as for example http), is transmitted to the telecommunications terminal. A so-called rights object is transmitted separately from the encrypted user data object via a secure channel to the telecommunications terminal, for example automatically by means of WAP push. The rights object contains a description of the rights granted to the user for use of the encrypted user object, a reference to the container object enabling the rights object to be assigned to the corresponding container object, and a key with which the encrypted user data object can be decrypted so that it can subsequently be used. A special device or application, which may be the aforementioned DRM agent, is required on the telecommunications terminal, such as the mobile radio device, in order to use the combination of the encrypted user data object packed in the container object and the rights object. After the rights object has been transmitted to the telecommunications device the rights object is transferred directly to the DRM agent, which is responsible for managing and keeping the secret, i.e. the key for decrypting the encrypted user data object. In practice the DRM agent stores the rights object on the telecommunications terminal and protects it against an unauthorized access by other applications or users. When an encrypted user data object is to be used, the DRM agent is activated first. The DRM agent searches for a rights object matching the container object in the memory area managed by it in the telecommunications device with the aid of the identification contained in the container object and also in the rights object, checks whether rights can be granted for the requested type of use (such as, for example, "playing back" music data or "displaying" image data, etc.) and, if the rights can be granted, decrypts the user data object using 11 the key from the rights object. With the above described method, in which an encrypted user data object and a rights object separate therefrom can be used, the value of digital data is no longer represented by the (encrypted) user data object or the container object itself, but rather by the rights object and the key contained therein, without which, of course, the encrypted user data object cannot be used. Thus, in this case, the encrypted user data objects can be stored packed in the container objects in a freely accessible manner on the telecommunications terminal.

Since, as already mentioned, the (encrypted) user data objects that are to be transmitted can be data objects with multimedia contents and consequently data having a large volume, a service providing large transmission capacity is required for a corresponding transmission of such data. The Multimedia Messaging Service (MMS) specified by the 3GPP (3rd Generation Partnership Project) and by the OMA, for example, has the capability to perform the switching and transmission of multimedia messages to and from mobile communications subscribers.

A combination of the two techniques DRM and MMS is therefore beneficial. With MMS, valuable digital content can be transmitted to other subscribers; at the same time the actual usage rights for the content can be defined and likewise transmitted. For this purpose the content is packed in the DRM container objects and optionally encrypted (depending on the chosen DRM method). The use of the content can thus be restricted to the addressed recipient(s) of the MMS message and, for example, an undesirable further distribution by simple forwarding of a message by the first recipient can be prevented. A further possibility is the forwarding of the encrypted content by a first MMS recipient to a second MMS recipient, a practice referred to as superdistribution. Independently of the transport of the encrypted content, both recipients must in this case receive rights separately from the rights provider in order to be able to decrypt and use the encrypted content.

Figure 1:
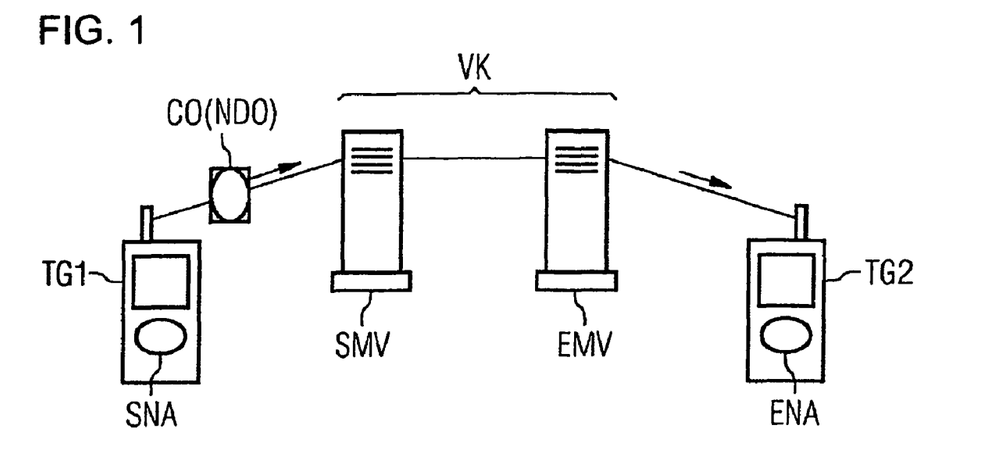
FIG. 1 shows a block diagram of a conventional MMS architecture for the transmission of user data objects from a telecommunications terminal via a switching component to a further telecommunications terminal.

The forwarding (superdistribution) of encrypted contents NDO contained in a DRM-protected container object CO from a first MMS recipient (in this case the sender) TG1 with a sending MMS user application SNA to a second MMS recipient TG2 with a receiving MMS user application ENA via an MMS switching component VK consisting of a sender-side MMS switching unit SMV and a recipient-side MMS switching unit EMV, as shown in FIG. 1, is altogether desired by the providers, since via this mechanism the contents are distributed among the users and each user must individually download a rights object if he or she wishes to gain access to the DRM-protected content. The downloading of a rights object from a server of a rights provider by a subscriber after receiving the DRM-protected content by MMS can be charged by the provider. In other words additional revenue can be generated.

In this case, however, the problem arises that the protected content is encrypted and the MMS switching units have no access to the content. In particular the otherwise possible and frequently practiced adaptation of the content of a multimedia message to the characteristics or capabilities with regard to the processing of the receiving MMS user application ENA and of the terminal device on which said processing is performed is consequently not possible. There exists the increased risk that a DRM-protected content which leaves the recipient-side MMS switching unit EMV in a multimedia message in unmodified form and without being controlled en route to the receiving terminal device cannot be used on the latter. This is all the more critical if the user of the receiving terminal device downloads a rights object matching the content object for a charge onto his or her mobile terminal device and discovers only after the downloading and invoicing associated therewith that the contents are not suitable for the terminal device or cannot be used or can be used only with restrictions.

SUMMARY OF THE INVENTION

It is therefore the object of the present invention to create a means of transmitting an encrypted user data object to a telecommunications terminal, wherein the telecommunications terminal's ability to process or use said object is assured.

This object is achieved by the independent claims. Advantageous embodiments are the subject matter of the dependent claims.

In this arrangement a method for transmitting encrypted user data objects to a first telecommunications terminal comprises the following steps. Firstly, in a switching component of a telecommunications network an encrypted user data object that is to be transmitted to the first telecommunications terminal is provided with a reference. In this case the encrypted user data object may previously have been provided with a reference by a data provisioning component (of a content provider or user data object provider), the reference serving to contact the data provisioning component (or possibly another defined data provisioning component). The reference can be used for obtaining the description of the characteristics of the encrypted user data object or for requesting the data provisioning component to check the suitability of the user data object for a telecommunications terminal. In particular the encrypted user data object can here be contained in a container object, such as a DRM container, in which the reference is also provided. If a switching component of a telecommunications network receives an encrypted user data object with a reference for transmission to a first telecommunications terminal, said switching component uses the reference to contact the specified data provisioning component and check the suitability of the user data object for the (first) telecommunications terminal. The switching component first determines a profile relating to the capability of the first telecommunications terminal to process a user data object. The switching component also transmits a request together with the determined profile of the first telecommunications terminal to a data provisioning component (in particular of the provider of the user data objects) according to an address contained in the reference in order to check whether the user data object to be transmitted can be processed by the first telecommunications terminal. Next, information concerning the check by the switching component is communicated by the data provisioning component and an encrypted user data object is provided by the switching component in accordance with the information concerning the check and the first telecommunications terminal is notified of this.

According to an advantageous embodiment the described method for transmitting encrypted user data objects is performed in accordance with the Multimedia Messaging Service (MMS). This enables the transmission of (encrypted) user data objects which can also include multimedia content having a large data volume, such as digital photographs or video clips.

According to an advantageous embodiment the method for transmitting encrypted user data objects can then appear as follows.

1. During the generation of an encrypted user data object, a provider of contents or of user data objects integrates into a container object for the DRM-protected user data object an additional reference for use by a switching component of a telecommunications network, in particular an MMS switching unit, for the functionality described below.

2. It is assumed that a user of a further telecommunications terminal would like to transmit an above described user data object, either encrypted or provided in a container object, via the switching component to the aforementioned first telecommunications terminal. For this purpose the encrypted user data object to be transmitted is first sent to the switching component and is now available there for further processing. The switching component, which in particular within the framework of the MMS has a recipient-side MMS switching unit which is assigned to the first telecommunications terminal to which the encrypted user data object is to be transmitted, checks the content of the user data object for the delivery to a receiving user application on the receiving telecommunications terminal. The encrypted user data object is in this case to be delivered by means of a delivery message, in particular by means of a multimedia message (MM) within the framework of the MMS, which has to be prepared.

3. The switching component (recipient-side MMS switching unit) analyzes the delivery message (MM) with regard to encrypted user data objects or DRM container objects (with user data objects) contained therein and a respective existence of signaling information or a reference, as has been explained under point 1. The reference can in this case be an address, for example in the form of a Uniform Resource Locator (URL). This reference or address, if present, is extracted from the DRM container object (encrypted user data object).

4. The switching component (recipient-side MMS switching unit) determines the characteristics or capabilities of the first (receiving) telecommunications terminal on which the receiving MMS user application is executed. This can be effected either by means of a query to a database in the area of the switching component (recipient-side MMS switching unit) or a further component of the telecommunications network of the network operator, to which the user of the first telecommunications terminal in particular is assigned as a customer. Alternatively the switching component (recipient-side MMS switching unit) can establish direct contact with the first telecommunications terminal on which the MMS user application is executed and, via this contact, query the characteristics or capabilities of the telecommunications terminal in respect of the processing of user data objects.

5. The switching component (recipient-side MMS switching unit) inquires of a data provisioning component of the content provider via the corresponding reference (URL) in the DRM container whether the encrypted content or the encrypted user data object is suitable for the receiving terminal device, i.e. can also be used on the latter. In this case the switching component (recipient-side MMS switching unit) integrates the profile information relating to the processing capabilities of the receiving telecommunications terminal into the request. In the request, the DRM-protected content itself can also optionally be transmitted to the data provisioning component by the MMS switching unit, as a result of which a content provider is relieved of the need to hold every content or every user data object in readiness on a permanent basis.

6. The data provisioning component analyzes the request and, contained therein, the profile characteristics of the telecommunications terminal (referred to in the following as the target terminal device) on which the DRM-protected content is to be used.

7. The data provisioning component then answers the switching component (recipient-side MMS switching unit) with a message including information which either indicates that the content is suitable for the target terminal device or that it is not suitable. This message optionally contains a pointer for the downloading of the suitable content or user data object from a data provisioning component or the suitable content or suitable user data object in DRM-protected form itself. This is useful in particular if the original content was not suitable for the target terminal device.

8. The switching component (recipient-side MMS switching unit) takes the information received into account as appropriate, composes or provides the delivery message (in particular MM) with suitable-objects for downloading by the MMS user application and sends a recipient notification (in particular MMS recipient notification conforming to a conventional MMS method) to the first telecommunications terminal, where the notification is processed by a corresponding user application (MMS user application).

9. The remainder of the procedure can be implemented in a conventional manner. Subsequently to the recipient notification, the user application (MMS user application) on the first telecommunications terminal requests the delivery message (MM) from the switching component (recipient-side MMS switching unit). For the DRM-protected objects in the delivery message (MM), the offering of a rights provider can be accepted for example via a corresponding browser of the first telecommunications terminal and one or more corresponding rights objects can be loaded—possibly independently of MMS—by a rights provisioning component (server) of the rights provider onto the first telecommunications terminal, as a result of which access to and use of the DRM-protected contents in the suitable format is then finally made possible on the terminal device.

To sum up, an essential aspect of the explained embodiment is therefore the additional signaling (by the provider of contents or user data objects) in the container for the DRM-protected or encrypted content, by means of which signaling firstly a reference for the use of the above explained functionality is integrated into the container and secondly the support of the provider of contents or user data objects using the data provisioning component for this additional functionality is signaled. Furthermore the switching component (recipient-side MMS switching unit) is assigned the additional functionality to examine DRM containers with regard to the above described signaling and initiate a corresponding communication with the provider of contents or user data objects or the associated data provisioning component. The switching component (recipient-side MMS switching unit) also receives the additional functionality to determine the characteristics or processing capabilities of the recipient terminal device and integrate them into the request to the data provisioning component. The data provisioning component receives a further essential functionality, i.e. to check the suitability of the DRM-protected content for the receiving telecommunications terminal and where necessary provide a better matching content or a suitable user data object.

According to an advantageous embodiment the first telecommunications terminal and possibly further telecommunications terminals as well as the switching component are part of a telecommunications network. In this case the telecommunications terminal or the further telecommunications terminals can be part of a first telecommunications network (in the case of a plurality of telecommunications terminals, however, these do not have to be part of the same telecommunications network). Accordingly the switching component, which is embodied in particular as a server of a data transmission service, such as, for example, as an MMS relay server, can be provided in a second telecommunications network which is connected to the telecommunications network (s) which is (are) assigned to the telecommunications terminal or the further telecommunications terminals. This second telecommunications network can be implemented in particular as a telecommunications network based on internet protocols, such as the Hypertext Transfer Protocol. It is furthermore conceivable that the data provisioning component is also provided in the second telecommunications network or in a further telecommunications network connected to said second network.

In order to be able to use the method for transmitting user data objects with maximum flexibility, the telecommunications terminal (or also the further telecommunications terminals) can preferably be embodied as a mobile telecommunications terminal. In particular it is conceivable that the data or messages to and from the first or the further telecommunications terminal are sent via an air interface. In this case the respective telecommunications terminal can include a radio module. The telecommunications terminal can be embodied, for example, as a mobile telephone, as a cordless telephone, as a smartphone (combination of a small portable computer and a mobile telephone), as a PDA (PDA: Personal Digital Assistant) or as an organizer. Furthermore the telecommunications terminal can also comprise other devices that are accessible by mobile means, such as a personal computer (PC) or a laptop which can be reached via a mobile radio network by means of a connected mobile radio device (mobile telephone or mobile radio module). The mobile radio device can then be connected to the personal computer or laptop for example via a cable or can also make contact with these wirelessly via an infrared interface or a local Bluetooth network.

As already mentioned, the transmission of data and messages to and from the respective telecommunications terminal can then be effected using WAP protocols or the Hypertext Transfer Protocol (http). In this case a telecommunications terminal, such as the mobile radio device, including the telecommunications network assigned thereto and embodied in the form of a mobile radio network can operate in accordance with the GSM (Global System for Mobile Communication) standard or the UMTS (Universal Mobile Telecommunications System) standard etc. Such mobile radio networks or telecommunications devices conforming to the GSM or UMTS standard can represent a platform for WAP protocols or for the WAP protocol stack (WAP: Wireless Application Protocol) by means of which data (messages or user data objects) can be transmitted in the respective mobile radio network.

Advantageously the first and the second telecommunications network are connected to one another by means of a connection component. In the case of the use of the WAP protocol stack, as mentioned above, it is possible, through the use of a WAP gateway as an interface or connection component between a mobile radio network and another network, for example a network based on an internet protocol, to create a connection to this network. In this way it is possible for the switching component to be located in a network based on an internet protocol, such as the internet, in which case the data (messages, user data objects) can be transmitted via a WAP gateway and finally via an air interface of a mobile radio network between the base station or base stations of the mobile radio network and to the respective telecommunications terminals of users. It should be mentioned in this context that, in particular within the framework of the MMS data transmission service, messages can be sent by an MMS relay server as part of a switching component automatically, i.e. without a request from a telecommunications terminal, to a telecommunications terminal by means of WAP push. In this case the MMS relay server serves as a so-called push initiator which causes the WAP gateway or a subcomponent thereof, namely the push proxy gateway, to send a message by WAP push to the telecommunications terminal. According to the MMS transmission service, for example, the recipient notification is transmitted to the first telecommunications terminal by means of WAP push.

According to an advantageous embodiment, the user data objects can be data in the form of text data, image data or video data, audio data, executable programs or software components, or a combination of these data types, i.e. multimedia data or content.

According to a further aspect, a telecommunications arrangement comprising a switching component, a data provisioning component, and at least one first telecommunications terminal is created, with the telecommunications arrangement being embodied to perform an above-mentioned method.

Preferred embodiments of the present invention are explained in more detail below with reference to the accompanying drawings, in which:

DESCRIPTION OF THE PREFERRED EMBODIMENTS

Figure 2:
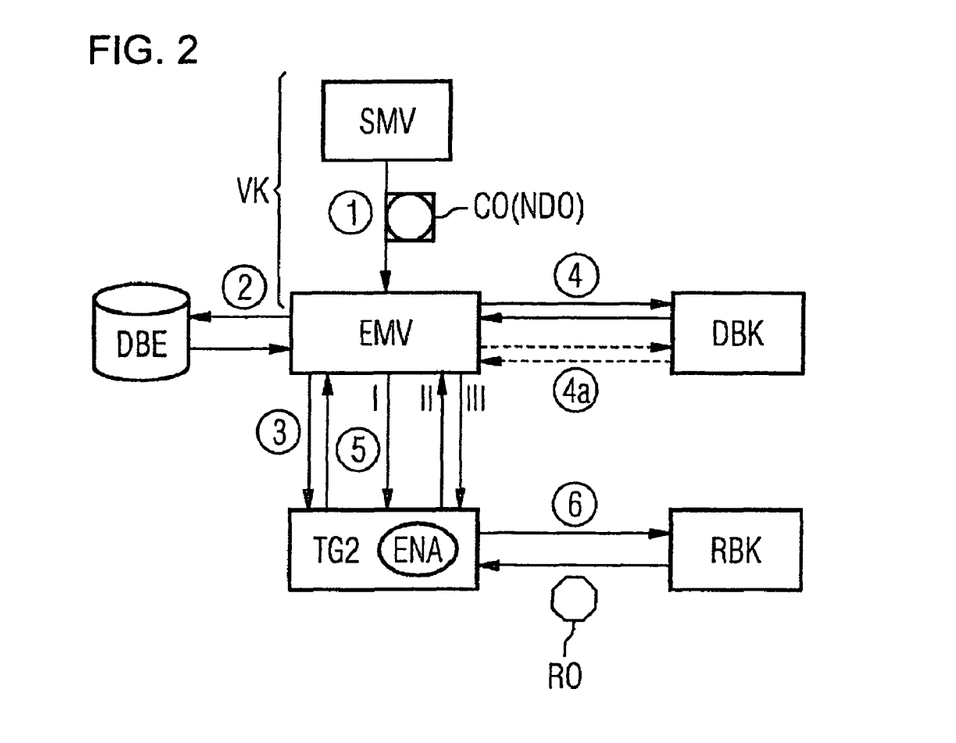
FIG. 2 shows a block diagram of a telecommunications arrangement in which the message flow during the transmission of an encrypted user data object according to a preferred embodiment of the invention is represented.

Reference is made to FIG. 2, which illustrates a message flow between components of a telecommunications arrangement during the transmission of an encrypted user data object to a telecommunications terminal according to a preferred embodiment of the invention.

As can be seen in FIG. 2, the telecommunications arrangement for performing a method for transmitting user data objects by means of the MMS comprises a switching component VK consisting of a sender-side MMS switching unit SMV, which is assigned to a sending telecommunications terminal (not shown, but refer to the telecommunications terminal TG1 of FIG. 1), and a recipient-side MMS switching unit EMV, which is assigned to a receiving telecommunications terminal TG2. In this arrangement the two telecommunications terminals are embodied for example as mobile telephones which can operate according to the UMTS standard. It is further assumed that the telecommunications terminal TG2 embodied as a mobile telephone (as also the (not shown) sending telecommunications terminal) is part of a mobile radio network. The mobile telephone TG2 is able to use WAP protocols (e.g. Wireless Session Protocol: WSP, etc.) or the WAP protocol stack in order to transmit data via an air interface to a corresponding stationary send/receive arrangement of the mobile radio network assigned to the mobile telephone TG2. In addition, the telecommunications arrangement comprises a database DBE, in which profiles of telecommunications terminals relating to the processing capabilities or processing characteristics of user data objects are stored, a data provisioning component DBK of a provider of contents or user data objects, and a rights provisioning component RBK of a provider of rights objects associated with the respective user data objects (the provider of rights objects and the provider of user data objects may be identical here). At the same time the database DBE, the data provisioning component DBK and the rights provisioning component RBK can be provided in the mobile radio network assigned to the mobile telephone TG2 or can be provided for example in the internet, which is connected to the mobile radio network of the mobile telephone TG1 via corresponding WAP gateways.

In the following description it is assumed according to FIG. 1 that there is provided on the mobile telephone TG2 an MMS user application or MMS user application ENA via which the mobile telephone TG2 communicates with the MMS switching unit EMV and the rights provisioning component RBK.

The signaling or message flow during the transmission/delivery of a multimedia message MM with DRM-protected content or user data object NDO to the MMS user application ENA on the target terminal device or mobile telephone TG2 shall now be explained in accordance with a preferred embodiment of the invention. The information or message flow is symbolized by the arrows in the block diagram and described with reference to the assigned numbers:

1. An encrypted user data object, i.e. a user data object NDO provided in a DRM container object CO, is transmitted by the sender-side MMS switching unit SMV to the recipient-side MMS switching unit EMV (cf. α). It is assumed here that the encrypted user data object has previously been sent for example by a further telecommunications terminal assigned to the sender-side MMS switching unit SMV (refer, for example, to the telecommunications terminal TG1 of FIG. 1) by means of a multimedia message for forwarding to the mobile telephone TG2. However, a plurality of (encrypted or DRM-protected) user data objects may also be contained in a multimedia message of this type.

2. The MMS switching unit EMV queries a database DBE for the characteristics or capabilities of the target terminal device TG2 with the receiving MMS user application ENA (cf. σ). A database of this kind can be attached to an MMS switching unit or be provided as a separate component in a telecommunications network which is connected to the MMS user application ENA. In it, the MMS switching unit can create one or more data records for the terminal devices used by the user individually for an individual MMS user. If there exists for the MMS switching unit EMV a means of accessing the information known in the mobile radio network (of the telecommunications terminal or mobile telephone TG2) regarding with which telecommunications terminal a user in the mobile radio network has registered, the MMS switching unit EMV can query the corresponding profile information for the terminal device from the database DBE. A requirement for this is that a profile for the currently used terminal device has already been stored in the database, i.e. that the MMS switching unit EMV has already communicated once with the MMS user application ENA on the currently used target terminal device of the user.

3. As an alternative to the query under point 2., the MMS switching unit EMV queries the target terminal device TG2 directly for the characteristics (cf. δ). For this purpose the MMS switching unit EMV triggers the MMS user application ENA on the target terminal device TG2 to transmit the characteristics or capabilities of the target terminal device TG2 in the form of profile information to the MMS switching unit EMV. The trigger can be implemented for example by means of a push message by WAP push or via a specially formatted/coded short message in the "Short Message Service" SMS. The response can be effected for example by "http-Post-Request", with the profile information being integrated as user data, or an "http-GET-Request" is sent which contains the profile information of the terminal device in the form of "http-Accept-Header-Fields" or in the form of a "WAP-User Agent-Profile". The response to the requests can either be omitted or return a simple status value to the target terminal device TG2. The address to which such a message can be sent by the target terminal device TG2 to the MMS switching unit EMV is sent in the first trigger message from the MMS switching unit to the target terminal device TG2. Since this functionality is of very fundamental importance also to other services and applications, the communication between target terminal device and a unit in the network can also be effected by another unit in the network instead of by the MMS switching unit. This can also be e.g. a proxy or a WAP push proxy gateway (PPG). After determining the characteristics of the target device, the MMS switching unit EMV can store the characteristics of the target terminal device TG2 as a profile in the database DBE according to point 2. in order to have the information available for future transactions with the target terminal device without again having to initiate a direct transfer of the information from the target terminal device TG2 to the network. In this way savings in terms of time, transmission capacity and costs can be made for the user.

4. Based on the information obtained in points 2. and 3. with regard to the characteristics of the target terminal device TG2, the MMS switching unit EMV examines the content of the multimedia message directed to the target terminal device (cf. φ). If said message contains DRM-protected user data objects and contained therein in turn are the reference and signaling for the functionality according to the invention for adapting DRM-protected contents to the characteristics of the target terminal device, the MMS switching unit EMV sends a request to the data provisioning component DBK of the content provider. The request contains either the DRM container object CO itself or an identifier for the DRM container object (e.g. a content URI) and in addition the description of the target terminal device characteristics. The data provisioning component DBK analyzes the target terminal device characteristics, establishes whether the DRM-protected content NDO currently contained in the multimedia message is suitable for the target terminal device, whether it can provide a more suitable variant as an alternative, or whether a suitable variant of the DRM-protected content cannot be provided. According to the result of the analysis, the data provisioning component DBK sends a response message containing information to the MMS switching unit EMV in which either the suitability of the already present DRM container object is confirmed or the DRM-protected content is made available in a more suitable form, or it is signaled by means of an error message that neither is the present DRM-protected content suitable nor can it be made available in an alternative suitable form. If the DRM-protected content is to be made available in a more suitable form, this can be accomplished either by direct integration into the response from the data provisioning component DBK to the MMS switching unit EMV, or only a reference or a pointer is integrated into the response, via which reference/pointer the MMS switching unit EMV can start-a separate transaction for retrieving the DRM-protected content in a suitable form from the data provisioning component DBK. This is represented in FIG. 2 as a separate, dashed pair of arrows with the designation "*4a*".

5. After the DRM-protected object or all DRM-protected objects NDO has/have been checked in an MM and where appropriate replaced or (due to lack of compatibility with the target terminal device) removed, the MM is delivered by the MMS switching unit in the conventional manner (cf. γ). First, a recipient notification I concerning the provision, on the MMS switching unit EMV, of a multimedia message which is to be transmitted and which-contains a user data object is sent to the MMS user application ENA. The MMS user application ENA responds in the variant shown with a delivery request II to the MMS switching unit EMV, which in turn delivers the multimedia message by MMS delivery message III.

6. The multimedia message together with the encrypted or DRM-protected user data object NDO has arrived at the MMS user application and can be used. A DRM license, which is referred to as a rights object RO, is required in order to use DRM-protected contents or user data objects. Said rights object RO is either already present on the target terminal device TG2 or is downloaded separately for the DRM-protected object(s) in the multimedia message by the target terminal device TG2 (cf. η). The content or the user data object can subsequently be used or displayed on the target terminal device, with the DRM-specific rights and restrictions being taken into account.

In the final analysis the method ensures that the contents or user data objects contained in a multimedia message—even if they are subject to DRM protection and are possibly encrypted—are transmitted to the target terminal device only in a form that is suitable for this device. Thus, the use of the transmission capacity from the MMS switching unit EMV to the MMS user application ENA on the terminal device is optimized and a means is provided to prevent the user of the target terminal device TG2 from receiving DRM-protected objects which he or she cannot use with his or her terminal device.

Figure 3:
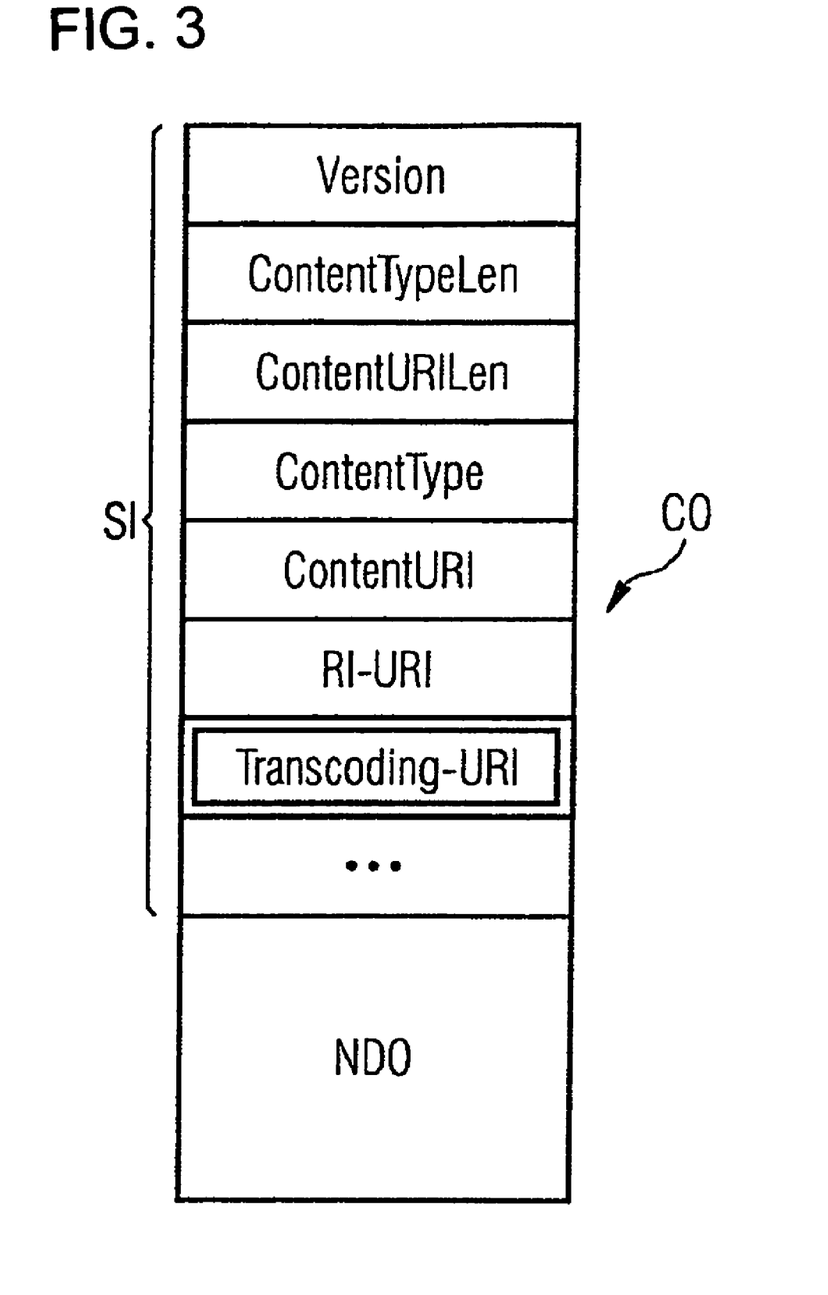
FIG. 3 shows a schematic representation of a container object according to an embodiment of the invention.

As already described above, the entire functionality is built on an additional information element (reference) in the encrypted user data object or in the container object CO for the DRM-protected content. Conventionally, a possible format for the container is described in the specification "OMA-Download-DRMCF-v1_0—DRM Content Format". According to this, a container object for a DRM-protected content is structured as shown in FIG. 3.

The container object CO is basically divided into 2 areas. The first contains control information SI and meta data relating to the content of the container, while the second area contains the DRM-protected content NDO in encrypted form. The control information SI includes the version of the specification to which the container corresponds, length specifications relating to the field "ContentType" and "ContentURI", the field "ContentType", which designates the type and format of the DRM-protected content in the container, the field "ContentURI", which contains a unique identifier for the present container object, and the "RI-URI", a reference to the rights provider which is used by a terminal device in order to download new rights objects (DRM licenses). The new element according to the invention is referred to as the "Transcoding-URI" and contains a reference to a resource via which a transaction according to the above description relating to step φ can be performed. In this case the transaction runs as an automated process and is based on defined requests and responses/answers with defined status codes and error messages. Interventions by human operators are not necessary either on the MMS switching unit EMV side or on the side of the data provisioning component DBK of the content provider. Further information can follow in additional header fields. The 2nd part of the container contains the user data object/the content in encrypted form.

The integration of the new signaling information or reference in the field "Transcoding-URI" is also possible alternatively for other container formats for DRM-protected contents. It is accomplished in an analogous manner for formats defined in the future. In the case of an individual user data object in a container object an individual element of signaling information is sufficient; with a plurality of objects in a DRM container object, an individual element of signaling information can also be assigned to each user data object in order to allow an individual check to be made per user data object.

We claim:

1. A method of determining the usability of encrypted user data objects by a first telecommunications terminal, which comprises the following steps:
 receiving, by switching component of a telecommunications network, an encrypted user data object to be transmitted to the first telecommunications terminal and a reference for checking a usability of the encrypted user data object by the first telecommunications terminal, the switching component not having access to a content of the encrypted user data object due to the encryption;
 the switching component determining a profile relating to capabilities of the first telecommunications terminal to process a user data object;
 transmitting, by the switching component, a request together with the determined profile of the first telecommunications terminal to a data provisioning component in accordance with an address contained in the reference for checking the usability of the encrypted user data object by the first telecommunications terminal;
 transmitting, from the data provisioning component to the switching component, information relating to a result of the check on the usability of the encrypted user data object to be transmitted for the first telecommunications terminal; and
 the switching component processing the encrypted user data object in accordance with the information relating to the check, and notifying the first telecommunications terminal thereof.

2. The method according to claim 1, wherein the encrypted user data object and the reference are provided in a container object.

3. The method according to claim 1, which comprises transmitting the encrypted user data object from a second telecommunications terminal to the switching component, for forwarding to the first telecommunications terminal.

4. The method according to claim 3, which comprises transmitting data to and from at least one of the first and second telecommunications terminals via an air interface.

5. The method according to claim 4, wherein at least one of the first and second telecommunications terminal comprises a radio module.

6. The method according to claim 5, wherein at least one of the first and second telecommunications terminal is a mobile telephone, a cordless telephone, or a portable computer.

7. The method according to claim 4, which comprises transmitting messages to and from at least one of the first and second telecommunications terminal using WAP protocols or Hypertext Transfer Protocol.

8. The method according to claim 1, wherein the step of determining the profile relating to the capabilities of the first telecommunications terminal comprises sending a query to a database of the telecommunications network wherein the terminal device characteristics are stored.

9. The method according to claim 1, which comprises determining the profile relating to the capabilities of the first telecommunications terminal by sending a query to the first telecommunications terminal.

10. The method according to claim 1, wherein the address contained in the reference includes a URL.

11. The method according to claim 1, wherein the encrypted user data object to be transmitted is also transmitted to the data provisioning component in addition in the request of the switching component to the data provisioning component.

12. The method according to claim 1, wherein, if the result of the check by the data provisioning component is negative, the information to the switching component contains a pointer to the data provisioning component from which the switching component can request a different usable user data object in accordance with the profile of the first telecommunications terminals.

13. The method according to claim 1, wherein, if the result of the check by the data provisioning component is negative, the information to the switching component contains a different usable user data object.

14. The method according to claim 1, wherein the first telecommunications terminal, in response to the notification of the switching component concerning the provision of a usable encrypted user data object, transmits a request for the usable encrypted user data object to be sent to the switching component, and the switching component thereupon sends the usable encrypted user data object to the first telecommunications terminal.

15. The method according to claim 1, wherein the first telecommunications terminal is part of a first telecommunications network.

16. The method according to claim 15, wherein the first telecommunications network is a mobile radio network.

17. The method according to claim 16, wherein the first telecommunications network operates in GSM or UMTS standard.

18. The method according to claim 15, wherein the switching component forms a part of a second telecommunications network that is connected to the first telecommunications network.

19. The method according to claim 18, wherein the second telecommunications network is a telecommunications network based on Internet protocols.

20. The method according to claim 19, wherein the second telecommunications network is a telecommunications network based on Hypertext Transfer Protocol.

21. The method according to claim 19, wherein the first and second telecommunications networks are connected to one another by way of a WAP gateway.

22. The method according to claim 1, which comprises, following receipt of the encrypted user data object, transmitting a rights object containing a key and usage rights for the received encrypted user data object.

23. The method according to claim 1, wherein the data provisioning component is a server of a content provider.

24. The method according to claim 1, wherein the user data object contains text information, audio information, video information, an executable program, a software module, or a combination thereof.

25. A telecommunications system for determining the usability of encrypted user data objects by a first telecommunications terminal, comprising:
    a switching component;
    a data provisioning component; and
    at least one first telecommunications terminal;
    said switching component configured to provide an encrypted user data object to be transmitted to the at least one first telecommunications terminal and a reference for checking a usability of the encrypted user data object by the at least one first telecommunications terminal, the switching component not having access to a content of the encrypted user data object due to the encryption;
    said switching component additionally configured to determine a profile relating to capabilities of the at least one first telecommunications terminal to process a user data object;
    said switching component configured to transmit a request, together with the determined profile of the first telecommunications terminal, to said data provisioning component in accordance with an address contained in the reference for checking whether the encrypted user data object to be transmitted is usable for processing by the at least one first telecommunications terminal;
    said data provisioning component configured to transmit to the switching component, information relating to a result of the check on the usability of the encrypted user data object to be transmitted for the at least one first telecommunications terminal; and
    said switching component configured to process the encrypted user data object in accordance with the information relating to the result of the check, and to notify the at least one first telecommunications terminal thereof.

* * * * *